ACCUMULATOR FOR PERFORMING ARITHMETIC OPERATIONS

Filed Dec. 30, 1965 Sheet 1 of 4

INVENTORS.
C. WAYNE COX
LOUIS M. HORNUNG

BY D. Kendall Cooper
ATTORNEY.

Feb. 4, 1969 C. W. COX ET AL 3,426,185

ACCUMULATOR FOR PERFORMING ARITHMETIC OPERATIONS

Filed Dec. 30, 1965 Sheet 3 of 4

United States Patent Office 3,426,185

Patented Feb. 4, 1969

3,426,185

ACCUMULATOR FOR PERFORMING ARITHMETIC OPERATIONS

Cecil Wayne Cox and Louis M. Hornung, Lexington, Ky., assignors to International Business Machines Corporation, Armonk, N.Y., a corporation of New York Filed Dec. 30, 1965, Ser. No. 517,563

U.S. Cl. 235—176 11 Claims

Int. Cl. G06f 7/50

ABSTRACT OF THE DISCLOSURE

The invention relates to accumulator circuits combining shift register operation and accumulating operation. Arithmetic factors with 1–2–4–8 weighted bit positions, and other factors, such as the corrective six and corrective ten, are applied serial-by-bit, serial-by-digit to a common trigger position, Carry (CY), and are supplied for utilization from the same trigger position (CY). Each bit interval includes a counting sub-interval and shifting sub-interval.

The invention is disclosed in connection with the processing of binary coded decimal (BCD) digits, but lends itself readily to arithmetic processing of numeric factors based on a variety of radices, such as radix 12 or radix 20. Arithmetic processing of BCD digits usually involves consideration of corrective factors, such as the corrective 6 and corrective 10. Processing of radix 12 digits entails consideration of a corrective 4 and corrective 12, while radix 20 involves a corrective 12 and 20. Because of the wide spread use of the BCD representation, the present invention is explained in connection with the processing of BCD digits.

A wide variety of arithmetic circuits have been developed for processing binary coded decimal data. In the binary coded decimal arithmetic representation, each numeric digit is represented by weighted bits according to a 1–2–4–8 format. During arithmetic operations, when it is desired to add or subtract such factors, it is essential that the various weighted portions of the digital 1–2–4–8 representations be taken into account, that carries resulting from the accumulation of one ordinal digit position of factors be considered properly as the next ordinal position is processed, and that various controls be established for handling operations other than addition, such as subtraction by complementing, and similar matters. The representation of numbers in the binary coded decimal format provides advantages when entering information or extracting information from a data processing system. Such numbers are readily converted to the more conventional decimal form for recognition by the operator of the equipment. However, the binary coded decimal format also leads to complications, well known in the art, such as the necessity for correcting any developed sum dependent upon whether or not the sum is greater than nine, such as by including a corrective six or corrective ten, handling the elusive "one" during subtraction, and related matters.

In prior art accumulators, the complications encountered in processing binary coded decimal factors have been handled by circuits having a comparable degree of complexity. In many prior accumulators, the arithmetic factors have been accumulated under control of a first complicated control network, while the various corrective factors have been taken into account under control of other complicated networks. Additional gating networks have been provided to gate information in and out of the respective weighted positions of the accumulator at the proper times during operations. Such arrangements have required timed sampling circuits, with gating associated with each weighted position. Also, additional inputs have been required for handling carries from one ordinal to the next. In many parallel types of accumlators, each trigger position has only a single weighted significance that remains unchanged throughout operations. All of the foregoing aspects of prior art accumulators have required large amounts of circuits, thereby increasing hardware costs.

Accordingly, an object of the present invention is to provide improved accumulator circuits for more efficient arithmetic operations.

Another object of the invention is to provide circuits for performing arithmetic operations in a more simplified fashion.

Still another object of the invention is to provide accumulator circuits for processing arithmetic factors in a serial, intermixed manner.

A further object of the invention is to provide circuits for arithmetically processing binary coded decimal factors with minimum operating complexities.

Another object of the invention is to provide binary coded decimal accumulator circuits for performing a variety of arithmetic operations, including addition and subtraction.

Still another object of the invention is to provide accumulator circuits wherein corrective operations are performed concurrently with the processing of numerically significant factors.

In order to accomplish these and other objects of the invention, accumulator circuits are disclosed herein in accordance with a preferred embodiment wherein the advantages of shift register operation and accumulating operations are combined, thereby resulting in a simplified processing of arithmetic factors. The accumulator circuits according to the present invention, develop arithmetically correct outputs while responding to inputs representative of arithmetic factors, and other factors, such as the corrective six and corrective ten, in a completely intermixed serial by bit, serial by digit manner. Regardless of arithmetic significance, or origin, all factors involved in arithmetic operations are applied to a common trigger position in the accumulator and are supplied for utilization from the same trigger position.

Additionally, while the various trigger positions of the accumulator are assigned significant arithmetic designations, such as, Carry-one bit-two bit-four bit-eight bit, such designations are applied for convenience only, and the various trigger positions are used for storing bit representations having varying amounts of weighted significance during arithmetic operations.

The arithmetic processing of two binary coded decimal factors including the development of a sum during addition or a difference during subtraction, together with the consideration of necessary corrective factors, and also including the reading of factors from memory and writing a new sum or difference into memory, comprises only two digital cycles of operation. With all factors, arithmetic and corrective, applied to a common trigger input, appropriate shifting is provided for during any arithmetic operation to insure that the weighted significance of the binary coded decimal bit positions is properly accounted for, and that other significant matters, such as carry from one ordinal position to another, are also properly accounted for.

The accumulator circuits combine the attributes of a counting accumulator and a shift register by appropriate interconnection of trigger positions. This insures that all inter-bit carries occurring within any binary coded decimal bit time, such as one bit, two bit, four bit, or eight bit time can be accommodated, and also insures that inter-digital carries are properly shifted and retained for later use. No special handling of carries from one ordinal position to another of two numbers being processed is required.

The foregoing and other objects, features, and advantages of the invention will be apparent from the following more particular description of the preferred embodiment of the invention as illustrated in the accompanying drawings.

In the drawings:

FIG. 1 represents a data processing system that incorporates the accumulator circuits of the present invention.

FIGS. 2*a* and 2*b* are detail and block representations, respectively, of a trigger circuit that is useful in the accumulator of the present invention.

Figures 5A, 6:
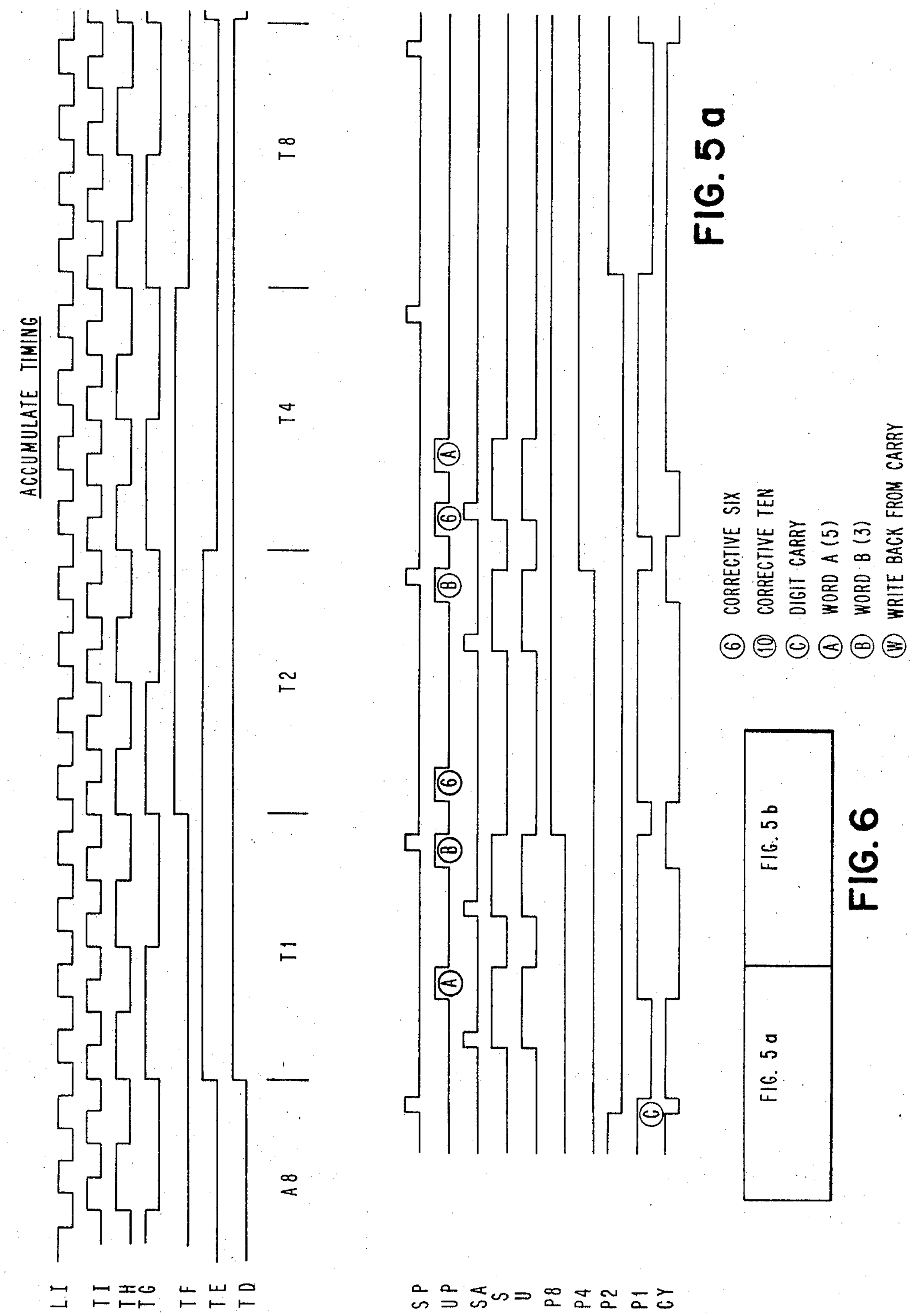
Figure 5B:
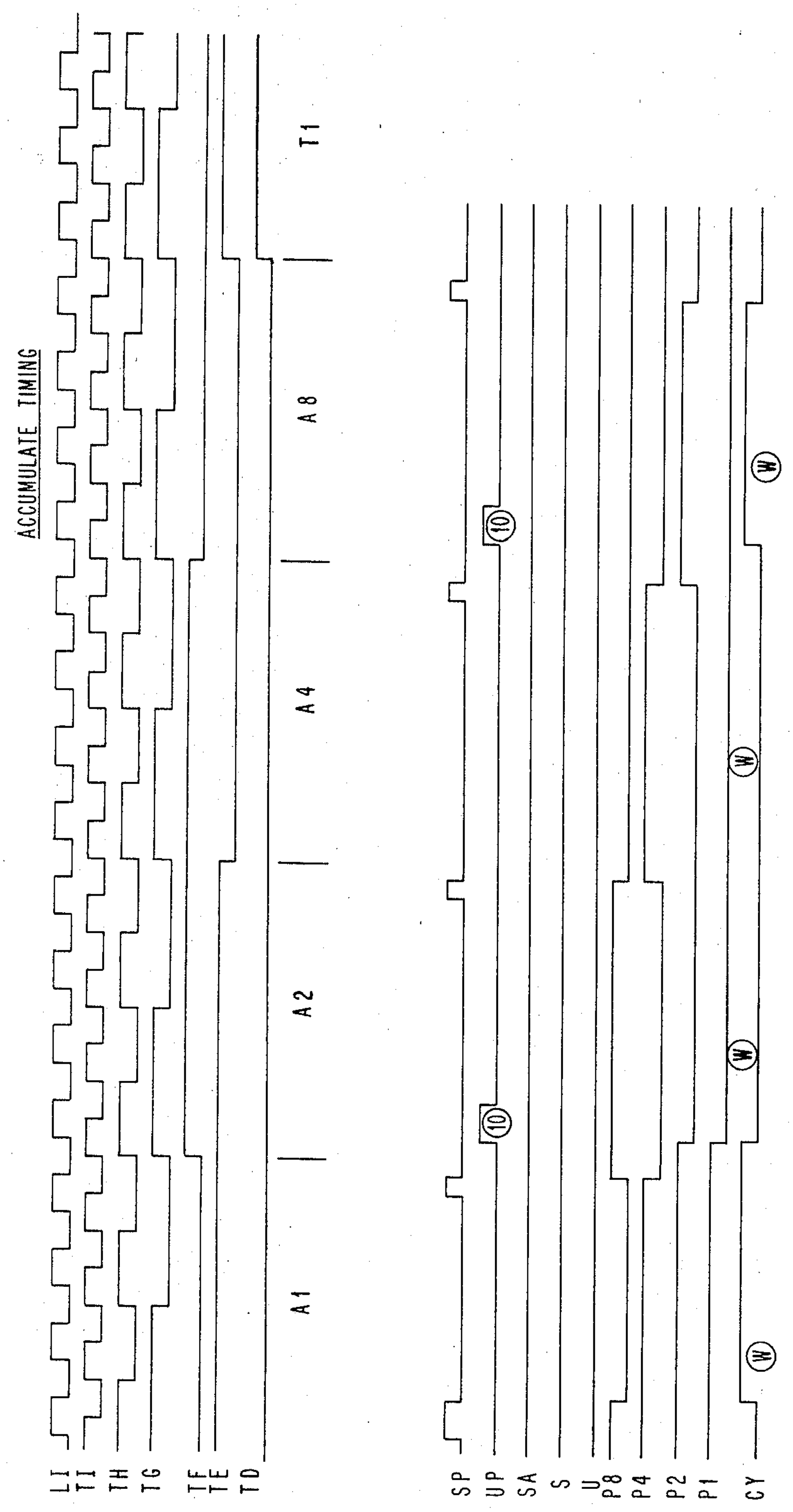

FIGS. 5*a* and 5*b*, when joined as shown in FIG. 6, together represent two digital clock times as required for adding two binary coded decimal factors while handling corrections required.

*Abbreviations and symbols*

The following abbreviations and symbols are used in describing the accumulator circuits of the present invention:

| | |
|---|---|
| A Word | TG clock time. |
| AC gate | Alternating signal Set and Reset. |
| AOI | And-Or-Invert circuit. |
| **A1** | **A1** time. |
| **A2** | **A2** time. |
| **A4** | **A4** time. |
| **A8** | **A8** time. |
| B Word | $\overline{TG}$ Clock time. |
| BCD | Binary coded decimal. |
| Circle **6** | Corrective 6 inputs, timing chart. |
| Circle **10** | Corrective 10 inputs, timing chart. |
| Circle C | Digit Carry, timing chart. |
| Circle A | Digit A inputs, timing chart. |
| Circle B | Digit B inputs, timing chart. |
| Circle W | Write output from Carry trigger timing chart. |
| CY | Carry trigger output. |
| $\overline{CY}$ | Not CY. |
| DC gate | Direct current Set and Reset. |
| I | Logical Invert circuit. |
| LE | Clock pulse, lags TE. |
| LI | Clock pulse, lays TI. |
| OR | Logical OR circuit. |
| OSC | Oscillator. |
| **P1** | "1" bit trigger output. |
| $\overline{P1}$ | Not **P1**. |
| **P2** | "2" bit trigger output. |
| $\overline{P2}$ | Not **P2**. |
| **P4** | "4" bit trigger output. |
| $\overline{P4}$ | Not **P4**. |
| **P8** | "8" bit trigger output. |
| $\overline{P8}$ | Not **P8**. |
| S | Sense or Storage trigger. |
| SA | Sense amplifier. |
| SP | Shift pulse. |
| **T1** | **T1** time. |
| **T2** | **T2** time. |
| **T4** | **T4** time. |
| **T8** | **T8** time. |
| TD | TD clock pulse. |
| $\overline{TD}$ | Not TD. |
| TE | Not TE. |
| $\overline{TE}$ | TE clock pulse. |
| TF | TF clock pulse. |
| $\overline{TF}$ | Not TF. |
| TG | TG clock pulse (A word). |
| $\overline{TG}$ | Not TG (B word). |
| TH | TH clock pulse (Read). |
| $\overline{TH}$ | Not TH (write). |
| TI | TI clock pulse. |
| $\overline{TI}$ | Not TI. |
| U | Data from Complement circuit. |
| UP | Upset (change) P triggers. |
| $\overline{UP}$ | Not UP. |
| WS | Word single shot (strobe for Read and Write). |
| & | Logical And circuit. |

Figure 1:
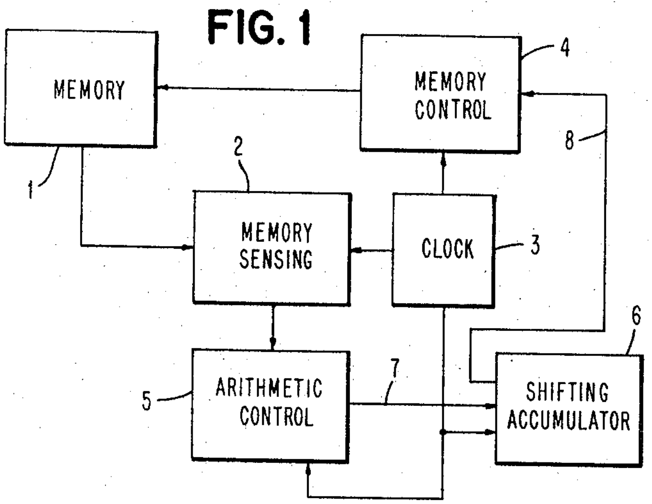

*Introduction—FIGURE 1*

FIG. 1 is a system for processing binary coded decimal data that incorporates the accumulator circuits of the present invention. Numerical data in BCD form is stored in memory 1. The numerical data is stored as words, each word comprising a number of digits having weighted bits of 1–4–8 significance. An arithmetic operation involves the summation or subtraction of words that are designated as A Word and B Word. During arithmetic operations the bits of the A Word and B Word involved are sensed alternately in increasing order of significance. That is, the 1 bit of the A word is accessed followed by the 1 bit of the B Word, the 2 bit of the A Word is accessed followed by the 2 bit of the B Word, and so on. The word bits are sensed by a memory sensing block 2 that includes a Sense Amplifier (SA) and a storage (S) trigger, shown in more detail in FIG. 4. Arithmetic operations are primarily under control of a clock 3 that is shown in more detail in FIG. 3. Clock 3 controls memory control 4 as well as arithmetic control 5. Arithmetic factors and correction factors are developed through arithmetic control 5 and applied to the shifting accumulator 6 by line 7. Outputs from shifting accumulator 6 are supplied by line 8 to memory control 4 for return to memory 1. The arithmetic control circuits, shifting accumulator circuits, and output to memory gate are shown in detail in FIG. 4. The various detailed circuits referred to in other figures will be discussed in later sections.

Figure 2A:
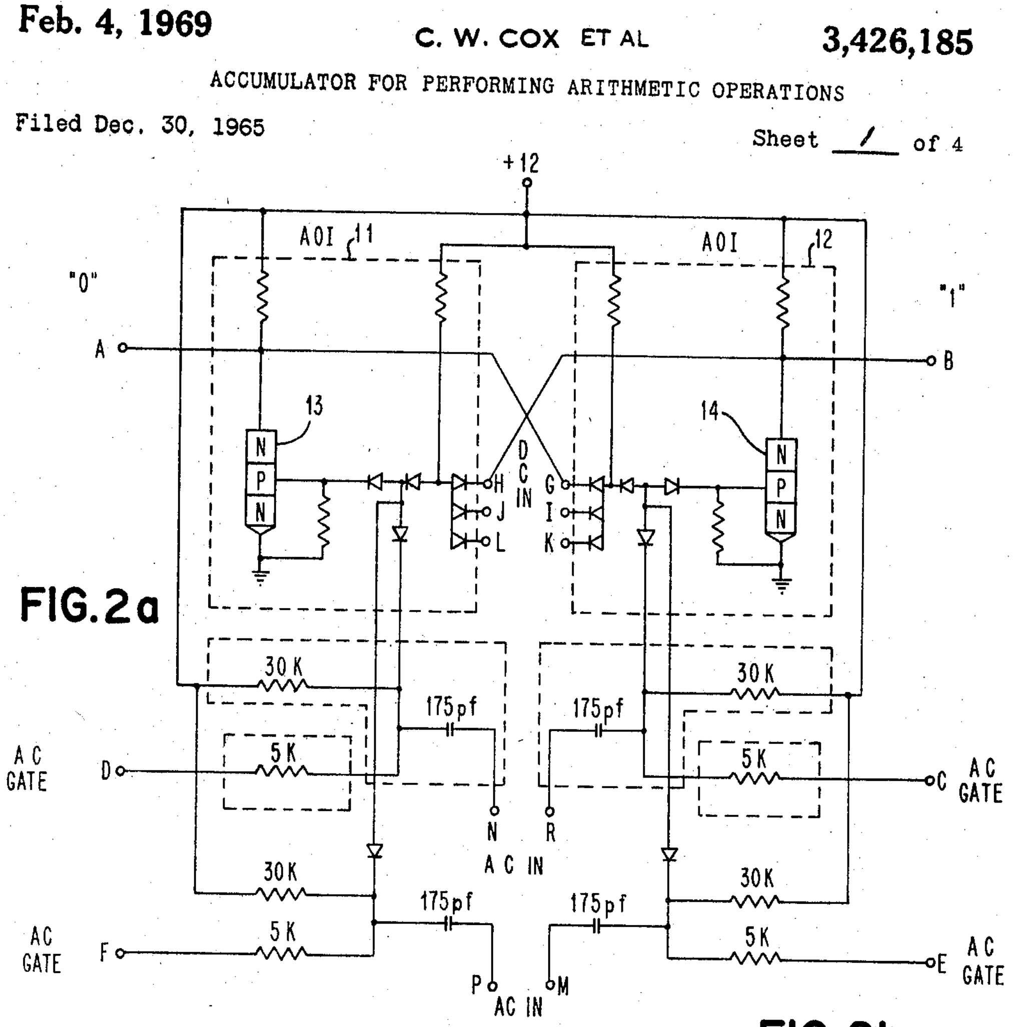
Figure 2B:
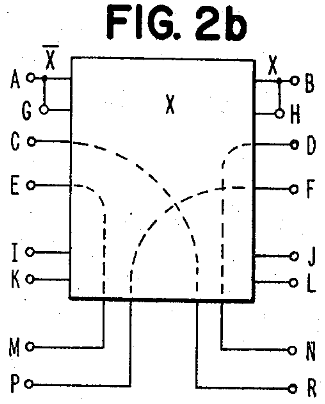

*Accumulator trigger—FIGURES 2a and 2b*

A trigger circuit that is useful in the shifting accumulator 6, FIG. 1, is illustrated in detail in FIG. 2*a* and shown in block form in FIG. 2*b*. The trigger circuit is provided with a number of input and output terminals designated A–R with corresponding terminals being comparably designated in both FIGS. 2*a* and 2*b*. The trigger circuit, FIG. 2*a*, comprises two AOI blocks in dashed lines at 11 and 12 that include transistors 13 and 14, respectively. In the normal or "zero" state of the trigger circuit, transistor 13 is cut off, thereby supplying a +12 volt output at terminal A. Transistor 14 is on and the "one" output at terminal B is at a ground or logical "zero" level. The state of the trigger is changed by application of appropriate DC levels or AC signals to the various input terminals. In order to set the trigger circuit to the "one" state, any of the DC inputs G, I or K is dropped to a zero level. This turns off transistor 14, raises terminal B to approximately +12 volts and thereby gives a "one" indication. The trigger circuit can be reset to the "zero" state by DC levels applied to terminals H, J, and L. Trigger cross-coupling is controlled by signals applied to inputs G and H from AOI blocks 11 and 12, respectively.

The state of the trigger can also be modified by application of alternating signals to AC inputs M, N, P or R, if an associated gate E, D, F or C, respectively, is conditioned. A gate is conditioned when its input is at ground. As an example, with terminal E gated, a negative shift to terminal M will set the trigger circuit to the "one" state. If terminal C is low, a negative shift to terminal R will also set the trigger to the "one" state. The double AC inputs are used primarily in connection with the Carry (CY) trigger, the P1 trigger, and the P2 trigger, used in the accumulator, FIG. 4. One set of AC inputs is used for shifting purposes and another set is used for counting purposes. Triggers P4 and P8, FIG. 4, have only a shifting capability and, therefore, do not require the double AC inputs.

Figures 3, 4:
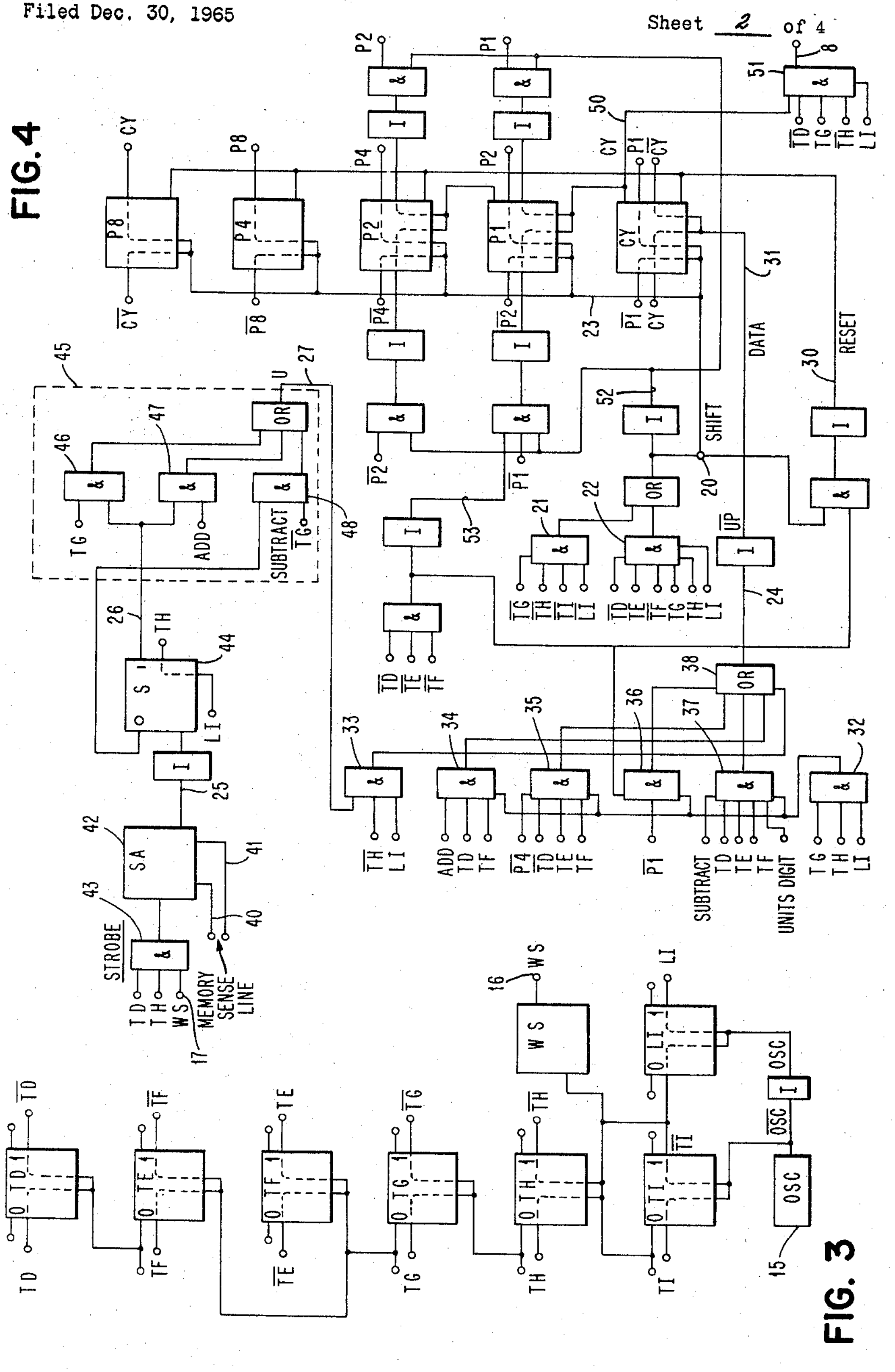
FIG. 3 shows suggested circuits for developing clock pulses required during operation of the accumulator circuits.
FIG. 4 shows the accumulator and associated arithmetic control circuits including input, output, and gating networks.

*Clock—FIGURE 3*

The clock circuit, FIG. 3, supplies various clock pulses shown in greater detail in the timing charts of FIGS. *5a* and *5b*. The clock circuit includes an oscillator circuit 15 that drives a number of trigger stages designated TD, TE, TF, TG, TH, and TI, and other logical circuits designated LI and WS. Reference is made to the abbreviations and symbols table previously given for the symbol designations. As will be more apparent in connection with FIGS. *5a* and *5b*, the various clock pulses are provided to access the A and B words from memory 1, FIG. 1, and to gate the appropriate logical networks in FIG. 4 for operation of the accumulator. As an example, an A word bit is accessed during TG clock time and a B word bit is accessed during a Not TG clock time. The word single shot (WS) supplies a strobe impulse from terminal 16 that is applied to terminal 17, FIG. 4, to strobe the data from memory 1 into the sense amplifier (SA). The operation of the clock circuits, FIG. 3, establish a number of significant data bit times designated T1, T2, T4, T8, A1, A2, A4, and A8, as seen in FIGS. *5a* and *5b*.

Various combinations of the clock outputs are combined in logical circuits including And (&) circuits, Or circuits, and Invert (I) circuits, FIG. 4. These include a number of special pulses as shown in the lower portion of FIGS. *5a* and *5b*, and indicated in the abbreviations and symbols table. A brief review of the special pulses made available in the logic of FIG. 4 may be useful. The Shift pulses (SP) are generated at junction 20, FIG. 4, from And circuits 21 and 22 and applied to all accumulator positions by line 23. The accumulator triggers are arranged as a closed loop shift register, with data shifted from Carry to P8, P1 to Carry, P2 to P1, P4 to P2, and P8 to P4. When a shift pulse occurs, set and reset gates associated with trigger positions P1 and P2 are deconditioned by a signal on line 52. This is provided so that no inputs other than those required for shifting will affect the accumulator triggers. The Upset P trigger pulses (UP) representing data bits and correction factor bits are developed on line 24, and Not UP pulses on line 31, FIG. 4. The sense amplifier (SA) outputs are made available during the accessing of data from memory 1 on line 25. The sense or storage (S) trigger supplies logical "1" outputs on line 26. Data representations during both the addition and subtraction operations are designated U and are supplied on line 27. The other wave forms designated CY, P1, P2, P4 and P8 in FIGS. *5a* and *5b* are representative of the states of the accumulator triggers, FIG. 4.

*Arithmetic control and accumulator—FIGURE 4*

The detailed logic required for the arithmetic control circuits and the accumulator circuits, briefly discussed in connection with the clock circuits, are shown in FIG. 4. The accumulator comprises 5 trigger positions designated Carry (CY), P1, P2, P4 and P8. The various trigger positions of the accumulator are selectively reset by impulses provided on line 30. During any operation involving the accumulator, all data and correction bits are supplied to the Carry trigger position by impulses on the data line 31. Timing for the data impulses is derived from the And circuits 32. Other And circuits 33, 34, 35, 36, and 37 supply appropriate gating through an Or circuit 38 for operation of the accumulator. And circuit 33 provides data inputs under control of the U signals on line 27. And circuit 34 provides signals representative of the 2 bit and 4 bit of the corrective six. And circuit 35 provides the 2 bit of the corrective ten. And circuit 36 provides the 8 bit of the corrective ten, and And circuit 37 is operative during a subtract operation to provide an elusive "one" input to the accumulator.

All data from memory is provided on lines 40 and 41 to the Sense amplifier 42 under control of the Strobe And circuit 43. Data bits are then directed by line 25 to the Storage trigger 44. Complementing circuitry designated 45 provides A word data bits through And circuit 46 and B word data bits through And circuit 47 during an Add operation. Subtraction using the accumulator circuits disclosed herein is performed by complementary addition. During a Subtraction operation, the A word bits represent the minuend and the B word bits represent the subtrahend. Only the subtrahend bits need be complemented and this is performed during the subtract operation under control of And circuit 48, FIG. 4.

The accumulator of FIG. 4 responds to the data and correction bits supplied on line 31 and at proper times provides significant data bits by line 50 to And circuit 51 that are in turn gated to memory control 4, FIG. 1, by line 8.

*Typical arithemetic operation—Addition of Carry + A Word + B Word—FIGURES 5a and 5b*

In order to illustrate the simplicity of gating and overall efficiency of operation of the accumulator circuits of the present invention, a typical arithmetic operation has been depicted in FIGS. *5a* and *5b* when arranged according to FIG. 6. A complete addition or subtraction operation involves eight distinct time intervals designated T1, T2, T4, T8, A1, A2, A4 and A8. For purposes of illustration, it is assumed that the mode of operation involves the addition of two words or digits, Word A and Word B, and particularly that the addition of digits in FIGS. *5a* and *5b* involves the "tens" ordinal position of the A word and the B word. The timing charts of FIGS. *5a* and *5b* assume that the "units" ordinal position of the two words involved has just been completed. The last portion of A8 time for the "units" operation is shown at the beginning of the sequence in FIG. *5a*.

A number of symbols have been established for convenience in reference to the various pulses involved during the operation as shown in the abbreviations and symbols table previously given. These symbols are also shown near the bottom of FIG. *5a* and comprise the following:

| | |
|---|---|
| Circle **6** | Corrective 6 inputs, timing chart. |
| Circle **10** | Corrective 10 inputs, timing chart. |
| Circle C | Digit Carry, timing chart. |
| Circle A | Digit A inputs, timing chart. |
| Circle B | Digit B inputs, timing chart. |
| Circle W | Write output from Carry trigger, timing chart. |

Referring to FIG. *5a*, significant bits for the A word and B word, as well as corrective 6 signals and corrective 10 signals are all made available on the UP line. For convenience, the wave form line in FIG. *5a* corresponds to the impulses on line 24, FIG. 4. However, the UP levels are inverted prior to application to the accumulator on line 31, FIG. 4. A Circle C carry representation is shown in connection with the T1 wave form, FIG. *5a*. Testing of the Carry position of the accumulator for writing back to memory occurs where indicated in FIG. *5b* by the Circle W symbols.

As shown in FIG. *5a*, it is assumed that a carry occurred during the addition of the A word and B word "unit" digits and that it is stored in trigger T1 near the end of A8 time. It is further assumed that it is now required to add the "tens" digits of the A word and B word which are a "5" and "3," respectively. The net sum resulting in the accumulator to be written back into memory should be 1+5+3, with the 1 representing the carry from the "units" operation.

For convenience, the following tabulation shows trigger states for the accumulator circuits and the time intervals and signals involved:

TYPICAL ADDITION: CARRY +5+3

| | CY | P1 | P2 | P4 | P8 | Decimal Count |
|---|---|---|---|---|---|---|
| A8 time, units ordinal: | | | | | | |
| Reset | 0 | 1 (carry) | 0 | 0 | 0 | carry |
| Shift | 1 (carry) | 0 | 0 | 0 | 0 | carry |
| T1 time, tens ordinal: | | | | | | |
| A Word, UP, Bit "1" of "5" | 0 (2 Bit) | 1 | 0 | 0 | 0 | 2 |
| B Word, UP, Bit "1" of "3" | 1 (1 Bit) | 1 (2 Bit) | 0 | 0 | 0 | 3 |
| Shift | 1 (2 Bit) | 0 | 0 | 0 | 1 (1 Bit) | 3 |
| T2 time, tens ordinal: | | | | | | |
| UP, Bit "2" of Corrective "6" | 0 | 1 (4 Bit) | 0 | 0 | 1 (1 Bit) | 5 |
| A Word, UP, No Bit | 0 | 1 (4 Bit) | 0 | 0 | 1 (1 Bit) | 5 |
| B Word, UP, Bit "2" of "3" | 1 (2 Bit) | 1 (4 Bit) | 0 | 0 | 1 (1 Bit) | 7 |
| Shift | 1 (4 Bit) | 0 | 0 | 1 (1 Bit) | 1 (2 Bit) | 7 |
| T4 time, tens ordinal: | | | | | | |
| UP, Bit "4" of Corrective "6" | 0 | 1 (8 Bit) | 0 | 1 (1 Bit) | 1 (2 Bit) | 11 |
| A Word, UP, Bit "4" of "5" | 1 (4 Bit) | 1 (8 Bit) | 0 | 1 (1 Bit) | 1 (2 Bit) | 15 |
| B Word, UP, No bit | 1 (4 Bit) | 1 (8 Bit) | 0 | 1 (1 Bit) | 1 (2 Bit) | 15 |
| Shift | 1 (8 Bit) | 0 | 1 (1 Bit) | 1 (2 Bit) | 1 (4 Bit) | 15 |
| T8 time, tens ordinal: | | | | | | |
| A Word, UP, No Bit | 0 (8 Bit) | 0 | 1 (1 Bit) | 1 (2 Bit) | 1 (4 Bit) | 15 |
| B Word, UP, Yo Bit | 1 (8 Bit) | 0 | 1 (1 Bit) | 1 (2 Bit) | 1 (4 Bit) | 15 |
| Shift | 0 (No Carry) | 1 (1 Bit) | 1 (2 Bit) | 1 (4 Bit) | 1 (8 Bit) | 15 |
| Extra Shift | 1 (1 Bit) | 1 (2 Bit) | 1 (4 Bit) | 1 (8 Bit) | 0 (No Carry) | 15 |
| Sample Carry for "1" Bit to Memory | 1 (1 Bit) | 1 (2 Bit) | 1 (4 Bit) | 1 (8 Bit) | 0 (No Carry) | 15 |
| Shift | 1 (2 Bit) | 1 (4 Bit) | 1 (8 Bit) | 0 (No Carry) | 1 (1 Bit) | 15 |
| A2 time, tens ordinal: | | | | | | |
| UP, Bit "2" of Corrective "10" (subtracts 14) | 0 | 0 | 0 | 0 (No Carry) | 1 (1 Bit) | 1 |
| Sample Carry for "2" Bit to Memory | 0 | 0 | 0 | 0 (No Carry) | 1 (1 Bit) | 1 |
| A4 time, tens ordinal: | | | | | | |
| UP, No Bit | 0 | 0 | 0 (No Carry) | 1 (1 Bit) | 0 | 1 |
| Sample Carry for "4" Bit to Memory | 0 | 0 | 0 (No Carry) | 1 (1 Bit) | 0 | 1 |
| Shift | 0 | 0 (No Carry) | 1 (1 Bit) | 0 | 0 | 1 |
| A8 time, tens ordinal: | | | | | | |
| UP, Bit "8" of Corrective "10" (Adds 8, net effect of Corrective 10 is to subtract 6) | 1 (8 Bit) | 0 (No Carry) | 1 (1 Bit) | 0 | 0 | 9 |
| Sample Carry for "8" Bit to Memory | 1 (8 Bit) | 0 (No Carry) | 1 (1 Bit) | 0 | 0 | 9 |
| Reset | 0 | 0 (No Carry) | 0 | 0 | 0 | 0 |
| Shift | 0 (No Carry) | 0 | 0 | 0 | 0 | 0 |

It is believed that the operation of the accumulator circuits of FIG. 4 during the addition of carry +5+3 is fairly evident from the foregoing tabulation of trigger states. However, a brief review of the operation follows.

Near the end of A8 time for the "units" digit of the A and B Words, trigger P1 stores a carry indication. All other triggers are reset. A shift pulse (SP) applied by line 23, FIG. 4, transfers the P1 carry representation to the Carry Trigger. Thus, the carry that was generated during the "units" digit time is weighted "1" in "tens" digit time.

During T1 time of the "tens" operation, the "1" bit of the "5" of the A word is read from memory. The bit is applied by line 31, FIG. 4, to the Carry trigger, resetting it and setting the P1 trigger to a state of 1. The 1 bit in the P1 trigger actually represents a count of 2 in the accumulator, that is, the carry that was stored plus the 1 bit of the A word. Near the end of T1 time, the circle B indicates the reading of the "1" bit of the "3" of the B word into the accumulator. This is applied by line 31, FIG. 4, and sets the Carry trigger to a state of 1. The accumulator now stores a count of 3. At the end of T1 time, a shift pulse on line 23, FIG. 4, shifts the bits in the P1 trigger to the Carry trigger and the Carry trigger to the P8 trigger. Therefore, the Carry trigger now stores a 2 bit representation and the P8 trigger now stores a 1 bit represnetation for a total count of 3.

During operation of the accumulator circuits according to the present invention, the bits of the two factors, that is the A word and the B word involved are read in serially by bit and corrective factors are also read in at appropriate times with correction of the sum in the accumulator being dependent upon whether or not a carry is stored in the accumulator. Therefore, at the beginning of T2 time, the "2" bit of the corrective "6" factor is applied on line 31, FIG. 4, to the Carry trigger. This resets the Carry trigger and sets trigger P1. The accumulator now has a count of 5 represented by a 4 bit in the P1 trigger and a 1 bit in the P8 trigger. The A word has no significant bit during T2 time and therefore the status of the accumulator remains unchanged. However, the B word has a 2 bit from the factor 3 and this is supplied to the Carry trigger by line 31, FIG. 4. The status of the accumulator is now as shown in the tabulation above with the total count being equal to 7. A shift pulse late in the T2 interval shifts P1 to Carry, Carry to P8, and P8 to P4.

Late in each cycle, the bits in the accumulator are shifted in order to prepare the accumulator for the next subsequent cycle by positioning the appropriate weighted bit in the Carry trigger in readiness for any corresponding weighted bit that may arrive on lines 31, FIG. 4. Therefore, the bits supplied throughout T1 time up until the shift pulse have a weighted significance of "1."

Correspondingly, the bits supplied during the time interval T2 up until the time of the shift pulse have a weighted significance of "2." The same principles apply to T4 time and T8 time.

During T4 time, the "4" bit of the corrective "6" and the "4" bit of the A word factor "5" are supplied by line 31 to the accumulator. The B word has no significant bit during interval T4 and the total count in the accumulator at the end of T4 time is 15. Referring to the tabulation for T4 time, the shift pulse shifts the bits in the accumulators so that the appropriate weighted "8" bit is now in the Carry trigger in preparation for T8 time.

During T8 time no significant bits are entered in the accumulator but the shift pulse is applied near the end of the time interval. The tabulation for T8 time shows that the accumulator now stores a sum that represents the total of the carry from the "units" operation, the "5" in the A word, the "3" in the B word, plus the corrective "6," for a total of 15. The bit representations at the end of T8 time correspond respectively to the designations given to the P triggers. That is, the 1 bit is stored in P1, the two bit is stored in P2 and so on.

At the beginning of A1 time an extra shift pulse supplied by And circuit 22, FIG. 4. moves the accumulated bits toward the Carry trigger so that the Carry trigger now contains the "1" bit of the total. This is sampled from line 50 and by way of And circuit 51, FIG. 4, to write "1" bit into memory 1, FIG. 1. Another shift pulse occurs late in the A1 time interval with the accumulator bit configuration as indicated in the tabulation above. At the end of A1 time the Carry trigger stores the "2" bit of the sum in the accumulator.

Due to the fact that no carry occurred during the "tens" operation, and also since a corrective "6" factor was added in the accumulator, it is necessary to add a corrective "10" to insure that the bits remaining in the accumulator properly represent the sum total of "9" as they should from the addition of 1+5+3. Just prior to the sampling of the Carry trigger during A2 time, the "2" bit of the corrective "10" is provided on the Not UP data line 31, FIG. 4. The application of the "2" bit of the corrective "10" to the Carry trigger resets Carry. The resetting of the Carry trigger in turn resets triggers P1 and P2. The gating arrangements are such that the rippling of the inter-bit carry progresses no further than the P2 trigger position. This is provided so that the 2 bit of the corrective 10 does not produce an inter-digit carry. Therefore, the status of the P4 and P8 triggers remains unchanged at this time. Following the addition of the "2" bit of the corrective "10" in time A2, the Carry trigger is sample as indicated by the Circle W symbol on the carry line, FIG. 5*b*. Since the carry trigger was reset to 0 no data bit will be supplied to memory. Late in the A2 time interval, a shift pulse occurs and shifts the 1 bit representation from P8 to P4. Prior to the shift, P4 stores the fact that there is no carry with a "0" representation. The shift at the end of A2 time shifts the no carry indication from P4 to P2 by leaving P2 in the "0" status. The accumulator at the present time stores a count of 1.

No data or corrective bits are supplied to the accumulator during A4 time and the sampling of the Carry trigger as indicated by the Circle W symbol FIG. 5*b*, results in no data being supplied to memory. Late in A4 time, a shift pulse shifts the accumulator so that the carry representation, that is, a 0, is shifted to trigger P1 and the 1 bit representation is shifted from trigger P4 to trigger P2.

During A8 time, the 8 bit of the corrective "10" factor is added to the accumulator by an appropriate pulse on line 31 to the Carry trigger. The P1 set gate is inhibited at this time by a signal on line 53 so that the 8 bit of the corrective 10 does not produce an inter-bit or inter-digit carry. The tabulation indicates that the Carry trigger now has a 1 with a significant weight of "8," that trigger P1 stores a 0 indicating no carry and that trigger P2 stores a 1 bit which has a "1" weighted significance. The total count presently stored in the accumulator is "9" which is the correct sum. Late in A8 time, the Carry trigger is sampled and since it is in the 1 state, an "8" bit is supplied to memory. Near the end of A8 time, all trigger stages of the accumulator are reset except P1 which stores the inter-digit carry and the accumulator is again shifted so that the proper states of the various accumulator triggers is reached. At this time accordingly, the carry trigger stores a 0 representing no carry during the "tens" addition operation.

At this time, the accumulator circuits are now in readiness for processing the "hundreds" digits of the A word and the B word as they stream from memory with appropriate correction determined by Carry, as required.

*Subtraction*

The subtraction operation is comparable to the operation of addition with the exception that provision is made for gating And circuit 48, FIG. 4, to complement the B word representing the subtrahend and that the And circuit 37 is gated during the handling of the "units" digit of the factors to compensate for the elusive "1" encountered during subtraction. Also, the corrective 6 And circuit 34 is inhibited. Other than these differences, the resetting of the triggers, the provision of data impulses to the Carry trigger, the shifting of the accumulator, the addition of a corrective 10, and the sampling of the accumulator condition from the Carry trigger position by way of And circuit 51, occurs in a manner that is comparable with the operation previously discussed in connection with adding of an A word and B word.

*Summary*

The foregoing description indicates a novel accumulator circuit has been provided in accordance with the present invention wherein the handling of arithmetic operations is greatly simplified. The proper sums and differences are developed by only a single reset line, a single shift line, and a single data line which supplies both arithmetic factors and corrective factors to the accumulator through a single trigger input. In addition, the status of the accumulator is sensed by appropriate timing through the same trigger position for writing information into memory. The circuit arrangements of the present invention permit the complete intermixing of data bits with corrective bits with the weighted bit significance being automatically taken care of during operation. The shifting accumulator according to the present invention can be modified in many respects to suit requirements. For example, while the correction procedures disclosed are considered to be the most efficient, circuits may be provided to add the corrective six at A2 and A4 times, instead of during T2 and T4 times, by sensing a sum that is greater than "9." In this case, the corrective "10" is not required for addition, but is still needed for subtraction.

Parallel outputs from the accumulator are available. For instance, near the end of A8 time, but prior to the reset and shift pulse the 1, 2, 4, and 8 bits of a sum are available from the P2, P4, P8 and CY stages of the accumulator, respectively. The A8 time signals may be used to control a printer or other device. By temporarily inhibiting the advance of the clock by techniques well known in the art, the interval during which the data is available may be extended as long as desired.

While the invention has been particularly shown and described with reference to a preferred embodiment, it will be understood by those skilled in the art that various changes in form and detail may be made without departing from the spirit and scope of the invention.

What is claimed is:

1. An accumulator circuit for performing arithmetic operations on a bit-by-bit basis with respect to two numerical digits during successive cyclic intervals of oepration, each of said digits having a corresponding plurality of significant weighted bit positions arranged in comparable ordinal order, comprising:

a plurality of ordinal triggers corresponding in number to the wieghted ordinals of said digits;

an auxiliary trigger for storing inter-digit carry representations;

a clock circuit, said clock circuit providing timing pulses durng each digital accumulating interval that define weighted bit intervals corresponding to the ordinal orders of said digits, each said bit interval including a counting sub-interval and a shifting sub-intervals;

counting circuit means interconnecting selected ones of said triggers for counting operation, including inter-bit carries occurring during each of said bit intervals;

data input circuit means connected to a particular one of said triggers;

shift circuit means interconnecting said triggers for closed loop operation as a shift register, said shift circuit means being operative in response to applied shift pulses to step each weighted ordinal bit representation previously processed arithmetically as stored in said triggers to said particular trigger just prior to the bit interval in which arithmetic consideration of said bit representation is required;

and arithmetic control circuit means connected to and operable under control of said clock circuit means to successively supply data bit pulses representative of additional arithmetic factors and corrective factors as they are to be processed solely to said data input circuit during said counting sub-intervals, and to further supply shift pulses to said shift circuit means during said shifting sub-intervals to shift data bits stored in said triggers.

2. The accumulator circuit of claim 1, wherein:

said digits are binary coded decimal digits with weighted bit positions designated 1–2–4–8, and wherein the successive bit representations are supplied alternately from each of said digits to said data input circuit.

3. An accumulator circuit as defined in claim 1, further comprising:

mode control means for establishing an addition or subtraction mode of operation in said circuit, and wherein said arithmetic control means is operative during an addition operation to supply said digits to said data inputs in the bit sequence provided, and operative further during a subtraction mode of operation to complement the bit representations of one of said digits before supplying the same to said data input, and wherein said arithmetic control means includes additional circuits for supplying an elusive "one" bit representation during a subtraction mode of operation.

4. The accumulator circuit of claim 1, further comprising:

data output circuit means connected to said particular trigger for supplying data bit representations following arithmetic operations.

5. The accumulator circuit of claim 1, further comprising:

reset circuit means responsive to said clock circuit and connected to said triggers for resetting each of said trigger positions to a predetermined bit representing state selectively as required.

6. An accumulator circuit for performing arithmetic operations with respect to two binary coded decimal numerical digits during successive cyclic intervals of operation, each of said digits having a corresponding plurality of significant weighted bit positions designated 1–2–4–8 arranged in comparable ordinal order, comprising:

a plurality of ordinal triggers corresponding in number to the weighted ordinals of said digits;

an auxiliary trigger for storing inter-digit carry representations;

a clock circuit, said clock circuit providing timing pulses during each digital accumulating interval that define weighted bit intervals corresponding to the ordinal orders of said digits, the timing pulses for each digit ordinal operation respectively designated T1–T2–T4–T8 and A1–A2–A4–A8, and each said bit interval including a counting sub-interval and a shifting sub-interval;

counting circuit means interconnecting selected ones of said triggers for counting operation, including inter-bit carries occurring during each of said bit intervals;

data input circuit means connected to a particular one of said triggers;

shift circuit means interconnecting said triggers for closed loop operation as a shift register, said shift circuit means being operative in response to applied shift pulses to step each weighted ordinal bit representation stored in said triggers to said particular trigger just prior to the bit interval in which arithmetic consideration of said bit representation is required;

and arithmetic control circuit means connected to and operable under control of said clock circuit means to supply data bit representations alternately from each of said digits to said data input circuit during said T1–T2–T4–T8 counting sub-intervals, to further supply a correction factor having bit representations to said data input concurrently with the data bit representations during said T1–T2–T4–T8 time intervals, to further supply an additional correction factor comprising bit representations to said data input during said A1–A2–A4–A8 time intervals, dependent upon the state of said auxiliary trigger and the correction required, and to supply shift pulses to said shift circuit means during said shifting sub-intervals.

7. The accumulator circuit of claim 6, further comprising:

data output circuit means connected to said particular trigger for deriving data bit representations following application of said additional correction bits during each A1–A2–A4–A8 time interval.

8. The accumulator circuit as set forth in claim 7, wherein:

said arithmetic control means supplies an extra shift pulse during said A1 time interval to position the accumulator bit representations in predetermined trigger positions for proper timed provision to said data output circuit means.

9. The accumulator circuit of claim 6, further comprising:

data output circuit means responsive to said clock circuit and connected to said particular trigger and operative following correction to supply output signals representing data bits from said accumulator to an external storage means, and wherein said external storage means supplies data bit representations to said data input circuit means, and wherein said arithmetic control means supplies all other corrective factor bit representations, shift pulses, reset pulses, and other gating required for arithmetic operation of said accumulator.

10. An accumulator circuit for performing arithmetic operations with respect to two binary coded decimal numerical digits during successive cyclic intervals of operation, each of said digits having a corresponding plurality of significant weighted bit positions designated 1–2–4–8 arranged in comparable ordinal order, comprising:

a plurality of ordinal triggers corresponding in number to the weighted ordinals of said digits;

an auxiliary trigger for storing inter-digit carry representations;

a clock circuit, said clock circuit providing timing pulses during each digital accumulating interval that define weighted bit intervals corresponding to the ordinal orders of said digits, each said bit interval including a counting sub-interval and a shifting sub-interval;

counting circuit means interconnecting said auxiliary trigger with trigger positions representing the 1 bit and 2 bit in said digits for counting operation, including inter-bit carries occurring during each of said bit intervals;

data input circuit means connected to said auxiliary trigger;

shift circuit means interconnecting said triggers for closed loop operation as a shift register, said shift circuit means being operative in response to applied shift pulses to step each weighted ordinal bit representation stored in said triggers to said particular trigger just prior to the bit interval in which arithmetic consideration of said bit representation is required;

and arithmetic control circuit means connected to and operatble under control of said clock circuit means to supply data bit representations alternately from each of said digits to said data input circuit during said counting sub-intervals, and to supply shift pulses to said shift circuit means during said shifting sub-intervals.

11. An accumulator circuit for performing arithmetic operations with respect to two numerical digits during successive cyclic intervals of operation, each of said digits having a corresponding plurality of significant weighted bit positions arranged in comparable ordinal order, comprising:

a plurality of ordinal triggers designated 1–2–4–8 corresponding in number to the weighted ordinals of said digits;

an auxiliary trigger designated Carry for storing inter-digit carry representations;

a clock circuit, said clock circuit providing timing pulses during each digital accumulating interval that define weighted bit intervals corresponding to the ordinal orders of said digits, each said bit interval including a counting sub-interval and a shifting sub-interval;

counting circuit means interconnecting said Carry–1–2 triggers for counting operation, including inter-bit carries occurring during each of said bit intervals;

data input circuit means connected to said Carry trigger;

shift circuit means interconnecting said triggers in sequence as Carry–1–2–4–8 for closed loop operation as a shift register, said shift circuit interconnections being from Carry to trigger 8, trigger 8 to trigger 4, trigger 4 to trigger 2, trigger 2 to trigger 1, trigger 1 to Carry, and said shift circuit means being operative in response to applied shift pulses to step each weighted ordinal bit representation stored in said triggers to said Carry trigger just prior to the bit interval in which arithmetic consideration of said bit representation is required;

and arithmetic control circuit means connected to and operable under control of said clock circuit means to supply data pulses to said data input circuit during said counting sub-intervals, and shift pulses to said shift circuit means during said shifting sub-intervals.

References Cited

UNITED STATES PATENTS

| | | | |
|---|---|---|---|
| 2,907,526 | 10/1959 | Havens | 235—174 |
| 2,997,233 | 8/1961 | Selmer | 235—92 |
| 3,207,888 | 9/1965 | Broce | 235—174 |
| 3,310,664 | 3/1967 | Broadbridge | 235—159 |

MALCOLM A. MORRISON, *Primary Examiner.*

D. H. MALZAHN, *Assistant Examiner.*

U.S. Cl. X.R.

235—159